United States Patent [19]

Young

[11] Patent Number: 5,215,674
[45] Date of Patent: Jun. 1, 1993

[54] METHOD FOR REDUCING THE RISK IN SHIPMENT OF LIQUID AMMONIA

[75] Inventor: Donald C. Young, Fullerton, Calif.

[73] Assignee: Union Oil Company of California, Los Angeles, Calif.

[21] Appl. No.: 545,855

[22] Filed: Jun. 29, 1990

[51] Int. Cl.$^5$ .......................... C09K 1/00; C07C 51/58
[52] U.S. Cl. .......................... 252/1; 252/544; 423/235; 423/237; 423/238
[58] Field of Search .................. 252/1, 544; 423/235, 423/237, 238

[56] References Cited

U.S. PATENT DOCUMENTS

| Re. 19,537 | 1/1935 | Pierce et al. | 220/451 |
|---|---|---|---|
| 3,538,867 | 11/1970 | Every et al. | 111/6 |
| 3,557,007 | 1/1971 | Cox | 252/544 X |
| 3,566,812 | 3/1971 | Barnes et al. | 71/65 |
| 3,716,350 | 2/1973 | Hashimoto | 71/28 |
| 3,984,227 | 1/1976 | McConnell et al. | 71/65 |
| 4,078,394 | 1/1978 | Chamberlain et al. | 62/203 |
| 4,508,558 | 4/1985 | Young | 71/30 |
| 4,699,633 | 10/1987 | Young | 55/5 |

FOREIGN PATENT DOCUMENTS 697772 11/1964 Canada.
1103311 10/1959 Fed. Rep. of Germany.

OTHER PUBLICATIONS

"Fertilizers", *Kirk-Othmer Encyclopedia of Chemical Technology*, Third Edition, John Wiley & Sons, vol. 10, pp. 54–55.

*Primary Examiner*—Robert L. Stoll
*Assistant Examiner*—C. Harris
*Attorney, Agent, or Firm*—Gregory F. Wirzbicki; William M. Dooley; Shlomo R. Frieman

[57] ABSTRACT

Accidental spills of liquid ammonia can result in the formation of deadly, fog-like ovoids of ammonia droplets that persist for an appreciably time before dissipating. The addition of a coalescing additive such as urea to liquid ammonia reduces the size and persistence of the cloud that can form if the treated ammonia is accidentally released to the atmosphere. The potential for death and injury resulting from an accidental release of ammonia is thus substantially reduced.

23 Claims, No Drawings

METHOD FOR REDUCING THE RISK IN SHIPMENT OF LIQUID AMMONIA

FIELD OF THE INVENTION

This invention relates to the shipment, storage, handling, and use of liquid ammonia, and more specifically to limiting the risk of harm in the event of an accidental spill of liquid ammonia.

INTRODUCTION

Anhydrous ammonia is used in massive quantities world-wide for many industrial and agricultural purposes. A gas at ambient temperatures and pressures, it is normally shipped and stored as a liquid, either in pressure vessels at ambient temperature, e.g., at about 20° C. and 100 psig, or in refrigerated vessels at ambient or nearly ambient pressure, e.g., at about −33° C. and 0.5 psig. It is transported in bulk in ships, barges, and railroad tank cars, and in tank trucks on public roads and highways. It is frequently stored in large quantities at industrial sites in populated areas and is frequently used as the working fluid in large refrigeration systems. It is now coming into wider use for the removal of NOx from flue gas at power generating stations in urban areas.

Anhydrous ammonia is an extremely hazardous, toxic, and volatile material In the event of an accidental discharge, it can cause immediate death to humans and animals and rapid death to trees and plants.

Both anhydrous liquid ammonia and very concentrated aqueous liquid ammonia display a deadly characteristic which substantially increases the risk of widespread injury and death in case of a spill. Specifically, upon sudden release to the atmosphere, as might occur in a train wreck or a traffic accident, the ammonia forms a cloud made up of an aerosol fog of liquid ammonia droplets. Unlike gaseous ammonia, which, though toxic, is lighter than air and quickly dissipates to harmless concentrations, the cloud can persist for a surprisingly long time, as long as several hours, before it finally disappears. The cloud is typically heavier than air and tends to drift along the surface of the earth, i.e., the ground or the surface of a body of water. The cloud moves with the wind and can sweep over a total area, i.e., a "footprint," much larger than the area covered by the cloud at any one moment. Contact with the cloud is instantly incapacitating, and a single breath can be fatal.

Substantial numbers of bulk shipments of anhydrous ammonia routinely move through or near densely populated areas. It is estimated that an anhydrous ammonia spill from a 40,000 pound truck trailer would generate a cloud having an average lethal footprint of 29 acres, that is, an area of 29 acres in which the concentration of ammonia would reach a lethal level, about 0.5 percent, before the cloud eventually dissipated.

SUMMARY OF THE INVENTION

It has now been found that both the size and the persistence, and hence the lethal footprint, of the for cloud formed by a sudden release of ammonia can be reduced by adding a suitable coalescing additive to liquid ammonia, the most preferred coalescing additive being urea.

DETAILED DESCRIPTION OF THE INVENTION

The present invention provides methods of treating liquid ammonia to reduce the hazard associated with accidental spills thereof. As used herein, the term "liquid ammonia" refers to any grade of ammonia which is normally shipped and stored in the liquid state and which boils at ambient temperature and pressure, i.e., 1 atmosphere and 20° C. Such ammonia has the propensity to form an aerosol fog upon sudden or abrupt release to the atmosphere. Thus, liquid ammonia suitable for treatment in accordance with this invention can be aqueous ammonia solution containing at least about 50 volume percent ammonia, preferably at least about 75 percent ammonia, and more preferably at least about 90 percent ammonia, and still more preferably at least about 95 percent ammonia. Most preferably, the liquid ammonia is anhydrous liquid ammonia. As the term is used herein, "anhydrous liquid ammonia" means liquid ammonia that is at least about 98 volume percent ammonia and up to about 2 volume percent water. For example, under one commercial standard, anhydrous liquid ammonia transported by pipeline must be at least 99.5 volume percent ammonia. Anhydrous liquid ammonia is thus substantially water-free, but nevertheless often contains a small proportion of water, e.g., about 0.1 to about 0.5 percent, purposely included to inhibit corrosion of storage vessels and pipes.

Liquid ammonia is usually maintained in the liquid state for shipment and storage under above-ambient pressures or below-ambient temperatures or a combination thereof. Anhydrous ammonia is often maintained at ambient temperature at a pressure of about 100 psig (pounds per square inch gauge); depending on the ammonia content, aqueous liquid ammonia can be maintained at lower pressures, e.g., 50 psig or 25 psig, at ambient temperature. Anhydrous liquid ammonia is also often maintained at about −33° C. at or near ambient pressure, e.g., 0.5 psig. Aqueous liquid ammonia can also be maintained at temperatures below ambient, e.g., 10°, 0°, −10°, or −20° C., but usually above the freezing point of the liquid and at above-ambient pressure if required.

In a sudden or abrupt discharge to the atmosphere of ammonia that has been maintained in a liquid state under above-ambient pressure or below-ambient temperature or both, the ammonia can rapidly, even violently, boil off or flash to vapor, rapidly absorbing heat from the surroundings and forming, not merely gaseous ammonia, but a fog-like cloud of ammonia droplets. Any sudden release of anhydrous ammonia under pressure, whether the liquid itself or the vapor from the vapor space of a container, will be violent and can be expected to result in the formation of an ammonia aerosol or fog. A breach in the vapor space of a cryogenic anhydrous ammonia storage tank would be less likely to result in formation of an aerosol because of the low pressure in the vapor space and the low heat transfer into the insulated tank. However, damage to the bottom of a cryogenic tank would release cold liquid ammonia directly onto the ground where it would absorb heat and flash off as vapor; such a spill can result in the formation of a dangerous ammonia cloud.

Aqueous ammonia solutions are also capable of forming ammonia aerosol clouds and thus can be treated beneficially in accordance with this invention. The likelihood that an ammonia aerosol will form as a result of a spill increases with increasing ammonia concentration in the solution. At higher ammonia concentrations, the vapor pressure of the solution at a given temperature is higher, and the boiling point at a given pressure is lower. As a point of reference, ordinary commercial 28 percent aqueous ammonia boils at about 90° F. at 1 atmosphere; under typical ambient conditions, a spill of such solution would be unlikely to result in an ammonia aerosol cloud even though hazardous amounts of gaseous ammonia could be released. More concentrated solutions, which have higher vapor pressures and lower boiling points, must be stored under pressure or refrigeration, and thus display a higher propensity to form ammonia aerosols in the event of abrupt discharge. For example, a spill of aqueous liquid ammonia containing about 50 percent ammonia poses an appreciable risk of forming a dangerous aerosol cloud, at least under certain circumstances.

When liquid ammonia treated with a coalescing additive in accordance with this invention is abruptly discharged so as to form a cloud of ammonia fog, the additive is carried is carried along with the discharged ammonia into the fog. The resulting cloud of ammonia fog is smaller than it would be in the absence of the additive. Furthermore, the additive speeds up the coalescence of the fog droplets into larger droplets that are heavy enough to fall to the ground, thereby shortening the life of the cloud. On the ground, the liquid ammonia droplets absorb heat and evaporate, and the resulting gaseous ammonia quickly dissipates. Because the cloud is smaller and persists for a shorter time, it sweeps a smaller area of ground, i.e., its lethal footprint is smaller, and thus it poses a risk to fewer people.

For the purpose of this invention, only small concentrations of additive are required. As little as 0.1 weight percent can be beneficial. Usually, at least about 0.5 percent is used, preferably at least about 1 percent, more preferably at least about 2 percent, and most preferably at least about 4 percent. Usually, no more than about 20 percent coalescing agent is used, preferably no more than about 16 percent, and more preferably no more than about 12 percent. The concentration of additive to use in a given instance depends on a number of factors, such as the particular additive chosen, the composition of the liquid ammonia to be treated, and anticipated conditions of shipment or storage.

Coalescing additives suitable for use in the practice of this invention are any compounds that are soluble to the desired extent in the liquid ammonia to be treated and are normally liquid or solid at ambient temperatures and pressures. A very large number of compounds satisfy these criteria, and any of them can be used with benefit in accordance with this invention. However, it will be understood that, in a particular case, the coalescing additive is ordinarily selected from compounds that are low in cost and compatible with the intended use of the liquid ammonia. A chemist familiar with the intended use of the ammonia to be treated will have no difficulty selecting an appropriate coalescing additive.

Since suitable coalescing additives are characterized simply by solubility and physical state, a very wide variety of substances can be used. Examples of specific compounds and kinds of compounds useful in the practice of this invention include, without limitation, ammonium salts such as ammonium nitrate and ammonium halides; ammonium alums such as ammonium aluminum chloride and ammonium aluminum sulfate; alkali and alkaline earth metal salts, particularly halides, such as potassium chloride, lithium chloride, sodium iodide, sodium carbonate; silver salts such as silver nitrate, silver iodide, and silver chloride; copper and copper salts; urea; biuret; hydrocarbon oils, preferably paraffinic oils; sulfur; alcohols, preferably high molecular weight alcohols; esters; nonvolatile ethers; glycols such as ethylene glycol, propylene glycol, and glycerol; alkylene oxides such as propylene oxide and higher alkylene oxides; amines and polyamines; polyethyleneimines; amides such as acetamide and formamide; polyepoxy surfactants, e.g., polyethylene oxide sulfonates; organohalides such as carbon tetrachloride and methylene chloride; and most organic acids such as propionic acid and butanoic acid, and hexanoic acid; and mixtures of the foregoing.

Since liquid ammonia is often used as a source of nitrogen, the coalescing additive is preferably a nitrogen compound as well, such as one of the nitrogen compounds listed above or mixtures thereof. Presently, the most preferred coalescing additive is urea. Urea is readily soluble in liquid ammonia and is fully compatible with major uses of liquid ammonia, such as agricultural use and NOx emission control. It is low in cost and readily available in the necessary quantities.

The following example is intended to illustrate particular embodiments of the invention and is not to be construed in any way to limit the invention.

EXAMPLE 1

Three small discharges of liquid anhydrous ammonia were carried out. In each, 1 pound of liquid ammonia was placed in a pressure vessel at ambient temperature, about 75° F., mounted 15 feet above the ground. A remotely operated solenoid actuated a valve that released the ammonia parallel to the ground through an orifice 0.25 inch in diameter. Discharge took about 10 seconds. The resulting aerosol cloud was videotaped and its size and persistence measured. Each cloud grew in size during active discharge of ammonia from the vessel, reached a maximum, and then dwindled until no part was visible.

The first discharge was of liquid ammonia without additive. The second was of liquid ammonia containing 5 weight percent urea. The third was of liquid ammonia containing 10 percent urea. The results are shown in the Table. Persistence is the time that any part of the cloud remained visible after ammonia stopped escaping from the vessel. Footprint is the area in square feet covered or swept by the cloud before it fully dissipated.

TABLE

| Sample | Persistence | | Footprint | |
| --- | --- | --- | --- | --- |
| | Sec. | % Chg. | Sq. Ft. | % Chg. |
| Ammonia | 20 | — | 500 | — |
| Ammonia, 5% Urea | 14 | −30 | 120 | −75 |
| Ammonia, 10% Urea | 6 | −70 | 50 | −90 |

Clearly, the addition of just 5 and 10 percent urea resulted in dramatic reductions in the length of time the ammonia cloud persisted after active discharge was complete, and the footprints of clouds from the treated ammonia were dramatically smaller than the one from the untreated ammonia. Treatment of anhydrous ammonia with urea in accordance with this invention reduced the potentially lethal footprint of the ammonia cloud by 75 to 90 percent.

Many suitable compositions of anhydrous ammonia and urea can be prepared. For example, compositions having about 0.1, 0.5, 1, 2, 4, 6, 8, 10, 12, 14, 16, 18, and 20 weight percent urea, and more, as well as compositions having urea concentrations intermediate the given concentrations, e.g., about 0.5 to 1.99, 2.01 to 3.99, 4.01 to 7.99, 8.01 to 11.99, 12.01 to 15.99, and 16.01 to 19.99 weight percent urea, can be prepared and used to advantage.

While particular embodiments of the invention have been described and illustrated herein, it will be understood that the invention is not limited thereto, since many obvious modifications can be made. This invention is intended to include any such modifications as will fall within the scope and equivalency of the appended claims. The term "in bulk" as used throughout the specification and the claims with reference to a quantity of liquid ammonia means that the entire quantity is contained in a single vessel or in a system of vessels in fluid communication with one another such that a single breach or leak anywhere in the vessel or system can result in the discharge of essentially the entire quantity of ammonia contained therein. All proportions stated in weight percent are by weight of total composition.

What is claimed is:

1. A method for reducing the duration of existence of an aerosol of ammonia, the method comprising releasing to the atmosphere a composition containing (i) liquid ammonia that vaporizes at one atmosphere and 20° C. and (ii) urea under conditions which, in the absence of the urea, would cause the liquid ammonia to form an aerosol of ammonia, whereby the urea reduces the extent of aerosol formation or speeds up the coalescence of aerosol droplets or both so that the duration of existence of the aerosol is shortened, the composition being released from a vessel containing at least about 1,000 pounds of the liquid ammonia which comprises less than about 20 weight percent urea.

2. The method of claim 1 wherein the liquid ammonia is anhydrous liquid ammonia containing at least about 98 volume percent ammonia and up to about 2 volume percent water.

3. The method of claim 1 wherein the liquid ammonia is anhydrous liquid ammonia containing at least about 99.5 volume percent ammonia and about 0.1 to about 0.5 volume percent water.

4. The method of claim 1 wherein the liquid ammonia contains at least about 90 volume percent ammonia.

5. The method of claim 1 wherein the liquid ammonia contains at least about 95 volume percent ammonia.

6. The method of claim 11 wherein the composition contains about 1 to about 20 weight percent urea.

7. The method of claim 1 wherein the composition contains about 2 to about 16 weight percent urea.

8. The method of claim 1 wherein the vessel from which the composition is released contains at least 10,000 pounds of the composition.

9. The method of claim 1 wherein the vessel from which the composition is released contains at least 40,000 pounds of the composition.

10. A method of reducing the duration of existence of an aerosol of ammonia, the method comprising releasing to the atmosphere a composition containing (i) anhydrous liquid ammonia and (ii) urea under conditions which, in the absence of the urea, would cause the anhydrous liquid ammonia to form an aerosol of ammonia, whereby the urea reduces the extent of aerosol formation or speeds up the coalescence of aerosol droplets or both so that the duration of existence of the aerosol is shortened, the composition being released from a vessel containing at least about 1,000 pounds of the anhydrous liquid ammonia which comprises about 1 to about 20 weight percent urea.

11. The method of claim 10 wherein the anhydrous liquid ammonia contains at least about 99.5 volume percent ammonia and about 0.1 to about 0.5 volume percent water.

12. The method of claim 10 wherein the composition contains about 2 to about 16 weight percent urea.

13. The method of claim 10 wherein the vessel from which the composition is released contains at least 10,000 pounds o the composition.

14. The method of claim 10 wherein the vessel from which the composition is released contains at least 40,000 pounds of the composition.

15. A method for reducing the duration of existence of an aerosol of ammonia, the method comprising releasing to the atmosphere a composition containing (a) liquid ammonia that vaporizes at one atmosphere and 20° C. and (b) a coalescing agent under conditions which, in the absence of the coalescing agent, would cause the liquid ammonia to form an aerosol of ammonia, whereby the coalescing agent reduces the extent of aerosol formation or speeds up the coalescence of aerosol droplets or both so that the duration of existence of the aerosol is shortened, the coalescing agent being (i) liquid or solid at one atomosphere and 20° C., (ii) soluble in the liquid ammonia at a concentration of at least about 0.1 weight percent, (iii) present in the composition in a concentration of less than about 20 weight percent, and (iv) selected from the group consisting of ammonium salts, ammonium alums, alkali halides, alkaline earth metal halides, alkali carbonates, alkaline earth metal carbonates, silver salts, copper, copper salts, sulfur, amines, polyamines, and amides, and the composition being released from a vessel containing at least about 1,000 pounds of the liquid ammonia.

16. The method of claim 15 wherein the liquid ammonia is anhydrous liquid ammonia containing at least about 98 volume percent ammonia and up to about 2 volume percent water.

17. The method of claim 15 wherein the liquid ammonia contains at least about 90 volume percent ammonia.

18. The method of claim 15 wherein the liquid ammonia contains at least about 95 volume percent ammonia.

19. The method of claim 15 wherein the composition contains about 1 to about 20 weight percent urea.

20. The method of claim 15 wherein the vessel from which the composition is released contains at least 10,000 pounds of the composition.

21. The method of claim 15 wherein the vessel from which the composition is released contains at least 40,000 pounds of the composition.

22. The method of claim 15 wherein the vessel from which the composition is released contains at least 10,000 pounds of the composition and the liquid ammonia is anhydrous liquid ammonia containing at least about 98 volume percent ammonia and up to about 2 volume percent water.

23. The method of claim 15 wherein the vessel from which the composition is released contains at least 40,000 pounds of the composition, the liquid ammonia is anhydrous liquid ammonia containing at least about 98 volume percent ammonia and up to about 2 volume percent water, and the composition contains about 1 to about 20 weight percent urea.

* * * * *

UNITED STATES PATENT AND TRADEMARK OFFICE
CERTIFICATE OF CORRECTION

PATENT NO. : 5,215,674

DATED : June 1, 1993

INVENTOR(S) : Donald C. Young

It is certified that error appears in the above-identified patent and that said Letters Patent is hereby corrected as shown below:

Title Page
[57] ABSTRACT
Line 3, replace "appreciably" with -- appreciable --.

Claim 6, column 5, line 48, replace "11" with -- 1 --.

Claim 10, column 5, line 58, replace "of" with -- for --.

Claim 13, column 6, line 11, replace "o" with -- of --.

Signed and Sealed this

Fourth Day of January, 1994

Attest:

BRUCE LEHMAN

*Attesting Officer*      *Commissioner of Patents and Trademarks*